United States Patent [19]

Seidman

[11] Patent Number: 4,928,367
[45] Date of Patent: May 29, 1990

[54] EARRING CLUTCH

[75] Inventor: Sheldon Seidman, Brooklyn, N.Y.

[73] Assignee: Automatic Findings, Inc., Brooklyn, N.Y.

[21] Appl. No.: 306,696

[22] Filed: Feb. 6, 1989

Related U.S. Application Data

[62] Division of Ser. No. 154,918, Feb. 11, 1988, Pat. No. 4,843,699.

[51] Int. Cl.⁵ .............................................. A44C 7/00
[52] U.S. Cl. ................................... 24/705; 63/12
[58] Field of Search ............. 63/12, 13; 24/705, 706.9, 24/662, 671

[56] References Cited

U.S. PATENT DOCUMENTS

| | | | |
|---|---|---|---|
| 3,698,044 | 10/1972 | Chernow | 24/706.9 X |
| 3,945,089 | 3/1976 | Gagnon | 24/705 |
| 4,700,552 | 10/1987 | Haley | 63/12 |

FOREIGN PATENT DOCUMENTS

| | | | |
|---|---|---|---|
| 417230 | 7/1910 | France | 24/706.9 |
| 218627 | 4/1942 | Switzerland | 24/706.9 |

Primary Examiner—James R. Brittain
Attorney, Agent, or Firm—Helfgott & Karas

[57] ABSTRACT

An earring clutch defined by a hollow metallic shell filled with an elastomer material. An axial bore extends diametrically through the shell, with each end of the bore terminating at a respective flanged opening. The bore receives the post of an earring in frictional, releasable engagement. To form the clutch, a hollow, apertured shell is submerged in a liquid elastomer material. A vacuum is drawn on the liquid causing the liquid to replace the air in the shell. The shell is removed from the liquid, the liquid elastomer material allowed to harden, and an axial bore then drilled through the hardened elastomer material.

9 Claims, 2 Drawing Sheets

EARRING CLUTCH

This is a division of application Ser. No. 154,918 filed Feb. 11, 1988 now U.S. Pat. No. 4,843,699.

BACKGROUND OF THE INVENTION

This invention relates to an earring clutch or clamp, and more particularly to an earring clutch which frictionally engages the post of an earring.

The post of an earring is generally a small cylindrical projection which is attached to the body of the earring. The post extends through a pierced hole in a human ear and is heeled in place by affixing or clamping a clutch to the free end of the post. Prior earring clutches have often been formed by some type of spring clamp or screw clamp, wherein the wearer of the earring places the earring post through the pierced hole in the ear, and applies the clamp by depressing a spring release element or elements, and then releasing it, with the effect that the ear lobe is now abutted on one side by the earring and one the other side by the releasable clutch or clamp member which is on the fee end of the post. In the case of a screw or clutch, the clutch must be skillfully manipulated to screw it onto the small cylindrical post.

While often satisfactory for their purpose, prior earring clutches have displayed the disadvantage of relative complexity, often required several parts including a spring and a spring release device in order to frictionally and yet releasable hold the free end of the post. Likewise, because of their small size, it is often difficult to manipulate the clutch onto the post. Furthermore, once tightened in place, the clutch may squeeze or pinch the ear lobe, especially as a result of the nature expansion of the ear lobe during daily routines.

SUMMARY OF THE INVENTION

According to the practice of the invention, an earring clutch employs an elastomer body which frictionally and yet releasably engages the free end of an earring post. The clutch is in the general form of a hollow metallic shell, such as a thined walled sphere, the shell provided with two diametrically opposite openings for the reception of an earring post. The shell is filled with an elastomer material. An axial bore is provided in the elastomer material coaxial with the respective diametrically opposed openings in the shell. The post is inserted into the bore and is frictionally held by the elastomer material.

Further according to the invention, the earrring clutch of this invention is fabricated by placing the hollow, apertured metallic shell into a liquid, hardenable elastomer material, such as urethane. A vacuum is drawn on the liquid elastomer material while the shell is submerged in it. The vacuum causes the evacuation of the shell of substantially all of the gas in it (the gas usually being air at atmospheric pressure) and a replacement of this gas by the liquid elastomer material. The shell is then removed from the liquid at the conclusion of the vacuum process and the elastomer material is allowed to harden. After hardening of the elastomer, the axial bore is formed as by drilling through the hardened elastomer materia.

The friction between an earring post and the elastomer material surrounding the axial bore is sufficient to hold the clutch onto the earring post, thereby providing a clutch with no moveable parts. By the nature of the frictional engagement between the earring post and the elastomer material, the clutch does not squeeze the ear since, as the ear may expand, the ear moves the clutch slightly outwardly on the post. Furthermore, application of the clutch is easy, since it requires no screwing onto the post or other skillful manipulations.

DETAILED DESCRIPTION OF THE INVENTION

Figure 1:
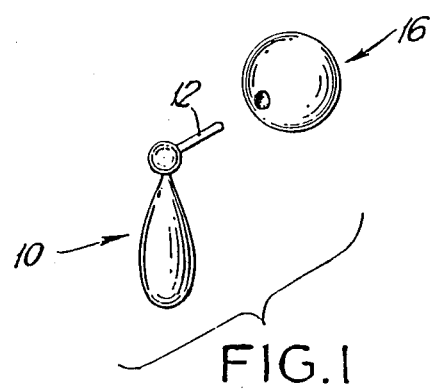
FIG. 1 is an exploded and perspective view showing an earring and the earring clutch of this invention.

Referring now to FIG. 1 of the drawings, the number 10 denotes generally an earring having a post 12 secured to it. Earring 10 and post 12 are conventional. The numeral 16 denotes the earring clutch of this invention.

Figure 2:
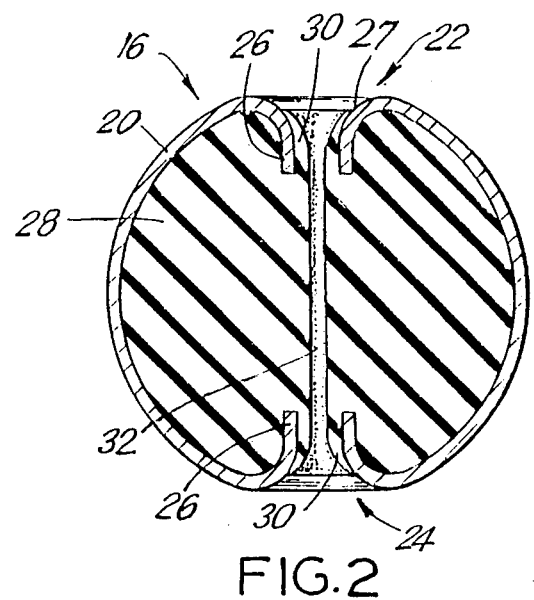
FIG. 2 is a cross-section taken along a major diameter of the earing clutch illustrated in FIG. 1.

Referring now to FIG. 2 of the drawings, the number 20 denotes a hollow metallic shell which may be formed, for example, of gold or a gold a alloy, silver, or any other rigid material, typically of metal and especially precious metal, either in a pure or alloyed form. The shell is illustrated as spherical, although the invention is not limited to this particular shape. The numeral 22 denotes an aperture at one portion of shell 20, while the numeral 24 denotes generally a second and diametrically opposite aperture. The numeral 26 denotes any one of two radially inwardly directed flanges, each integrally associated with the periphery of a respective opening, the flanges being annularly continuous, although it will be understood that the invention is not limited to this particular shape of flange. The aperture is formed with a wider mouth 27 at the other periphery which aids in directing the clutch onto the post.

The numeral 28 deontes an elastomer material, preferably completely filling the interior of the shell 20. The numeral 30 denotes a widened mouth formed by a portion of the elastomer 28 which is radially inwardly of flanges 26. The numeral 32 denotes an axial bore extending diametrically through the shell 20 and having ends which communicate with the openings 22 and 24. The ends of the bore likewise flare outwardly to also provide a mouth in the elastomer material.

Figure 3A:
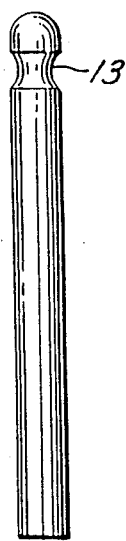
FIGS. 3A, 3B and 3C show typical earring posts.
Figure 3B:
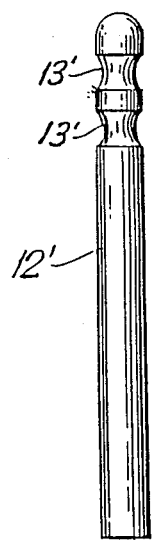
Figure 3C:
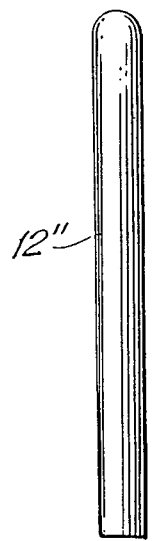

FIGS. 3A and 3C show typical posts which can be used for the earring 10, the post 12 shown at FIG. 3A being provided with groove 13 to assist in frictional engagement between the post and the elastomer 28, as will shortly be described. The post 12' shown in FIG. 3B has two groves 13'. MOre groves could also be used. Such grooves are typically required to aid in the retention to a clutch. The post 12" shown in FIG. 3C has a smooth post which normally would not be used with a clutch of the prior art, since it has no retention capabilities. However, with the present clutch, such a smooth post can be used.

In use, the earring clutch shown at FIG. 2 is employed in the manner indicated at FIG. 1, namely the post 12 is passed through an already pierced opening in the ear lobe an an individual, with the earring 10 being on the outside of the lobe. The clutch 16 is then aligned with the free end of the post 12, such that one of the openings 22 or 24 receives the free end of the post. The clutch 16 is then pushed towards the ear lobe until engagement with the latter is made. By virtue of the frictional engagement between the post 12 and the interior of axial bore 32, the clutch is relatively firmly anchored on the post, yet is free to move should the lobe expand slightly or should the user desire to remove the earring. To effect such removal, the earring 10 is grasped with one hand and the clutch 16 is simply pulled away off of the post 12 with the other hand.

Figure 4A:
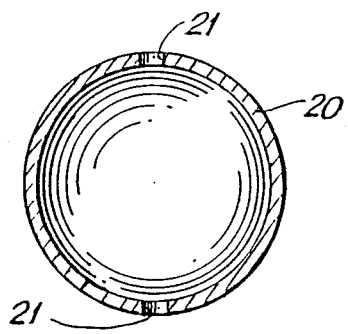
FIG. 4A illustrates a portion of the earring clutch shown at FIG. 2 at one stage of manufacture of the clutch.
Figure 4B:
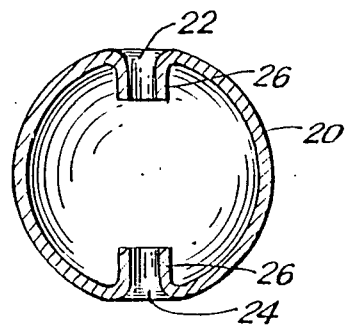
FIG. 4B is a view similar to FIG. 4A and shows a portion of the earring clutch at a later stage in manufacture.

FIGS. 4A through 4F illustrate a preferred method of forming the earring clutch of this invention. In FIG. 4A, a hollow shell 20 is provided with two diametrically opposed holes or openings 21, preferably along a major diameter. As shown at FIG. 4B, these holes are then inwardly reamed so as to produce the annularly continuous and radially inwardly directed flanges 26 and the wide entry mouth.

Figure 4C:
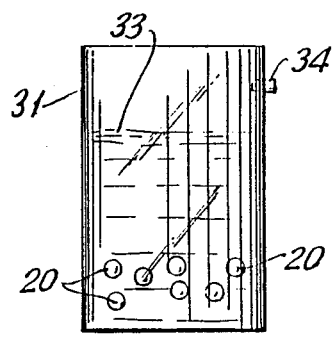
FIGS. 4C and 4D show a process for filling the outer metallic shell of the earring clutch of this invention with with an elastomer material.
Figure 4D:
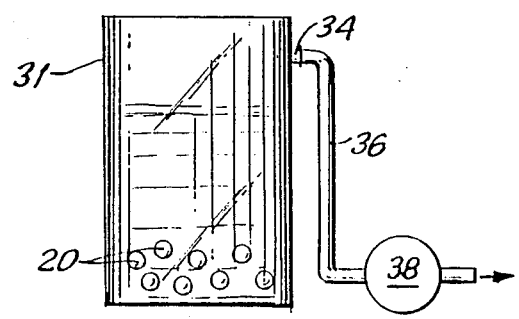
Figure 4E:
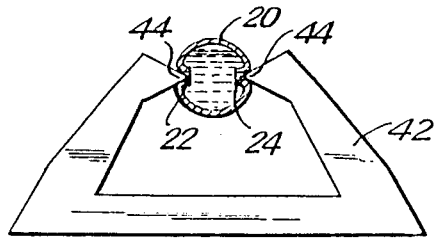
FIG. 4E shows a later stage in the formation of the clutch subsequent to filling its hollow metallic shell with an elastomer material, and specifically the hardening process.
Figure 4F:
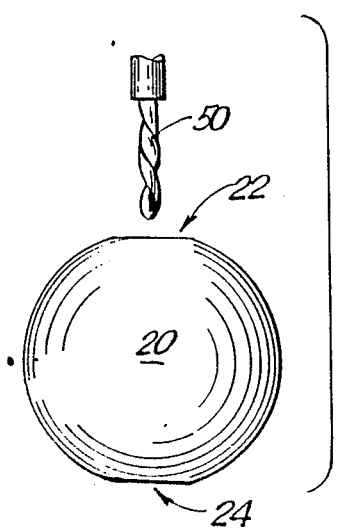
FIG. 4F illustrates the formation of an axial bore in the hardened elastomer material in the clutch.

Referring now to FIGS. 4C and 4D, a method of filling each hollow shell 20 is shown. A plurality of such hollow shells 20 is submerged within container 31 in a quantity 33 of a liquid, hardenable elastomer material, such as urethane. An elastomer material which has been found satisfactory is sold under the trade designation PMC-724 Castable Urethane Elastomer, which is marketed by Smooth-On, Inc. of 1000 Valley Road, Gillette, N.J. 07938. By means of inlet 34, conduit 36, and vacuum pump 38, the container 31 is now placed under a vacuum. The vacuum above the level of liquid elastomer material 33 results in the evacuation of substantially all of the air or other gas in the interior of the spheres 20, this gas being replaced with the liquid elastomer material. At the conclusion of the vacuum application and filling of the spheres, while the elastomeric material is still liquid, the filled spheres are removed and each individual sphere is now placed on a jig 42 as illustrated at FIG. 4E. This jig has a pair of opposed spring held projections 44 which extend into respective openings 22 and 24, with the pointed tips serving to both support the shell 20 while the elastomer is hardening and also to form the widened mouth 30 FIG. 2 in the elastomer material inside flanges 26. At the conclusion of the hardening of the elastomer, each shell 20 is removed from the jig and provided with the axial bore 32 by means of a drill 50, as indicated at FIG. 4F. The widened mouth 30 assists in locating the post end in the axial bore.

Figure 5:
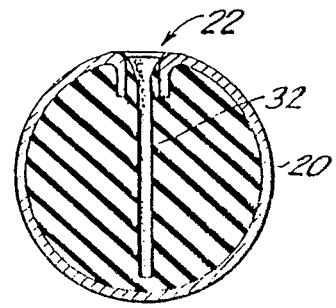
FIG. 5 is a view similar to FIG. 2 and shows an embodiment wherein only a single aperture is proved in the hollow metallic shell of the clutch.

As indicated at FIG. 5, it will be apparent that only one of the two openings 22, 24 need be employed, and only one such opening 22 shown at FIG. 5, merges into the axial bore, corresponding to bore 32 of the embodiment of FIG. 2, and extending only partially along a major diameter of the shell or sphere 20. In using the embodiment of FIG. 5 the post can be burried inside the clutch and does not extend beyond the clutch to scrap the face. By using two openings, however, as shown in FIG. 2, the clutch becomes reversible so that it can be placed onto the post in either opposing direction.

Figure 6:
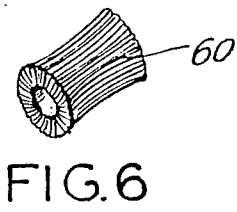
FIGS. 6 thorugh 8 show by way of example the various shapes of the clutches that can be used.
Figure 7:
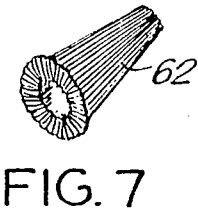
Figure 8:
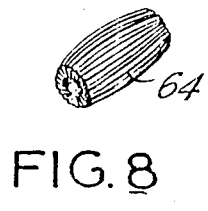

Referring now to FIGS. 6, 7 and 8, alternative shapes of the shell 20 are shown and are indicated, respectivedly, by the numerals 60, 62 and 64. However, these are just exemplary and other shapes could likewise be used. In these latter three embodiments, as well as the embodiment of FIG. 5, the method of placing the elastomer within the hollow shell is the same as indicated at FIGS. 4C and 4D.

While the invention has been described with detailed reference to the drawings, it will be obvious to those skilled in the art that many modifications and changes can be made within the scope and sphere of the invention as defined in the claims which follow.

What is claimed is:

1. An earring clutch comprising a body portion having a hollow shell filled with an elastomer material, said body portion being formed with at least one aperture communicating with an interior of said elastomer material and having a bore in said elastomer material extending from said aperture into the interior of said elastomer material for receiving and releasably frictionally retaining a post portion of the earring, and further comprising at least one flange formed on said shell and defining said aperture, said flange being annularly continuous about an axis of said bore and projecting inwardly of said shell into said interior so that a portion of said elastomer material is located between an inner wall of said flange and said bore thereby covering both sides of said flange in said elastomer material.

2. The earring clutch of claim 1, wherein said shell is substantially spherical.

3. The earring clutch of claim 1, wherein the post portion is substantionally burried in the shell.

4. The earring clutch of claim 1, wherein said elastomer material is castable urethane.

5. The earring clutch of claim 1, wherein said flange forms a wide mouth at the opening to said aperture.

6. The earring clutch of claim 5 wherein said elastomer material has a wide mouth at said aperture continuous with the wide mouth formed by said flange.

7. The earring clutch of claim 1, wherein said portion of said elastomer material annularly surrounds said bore in the region of said flange.

8. The earring clutch of claim 1, wherein two diametrically positioned flanges, inwardly projecting into said interior and defining two diametrically positioned apertures in said body portion are provided, each flange being radially spaced from said bore to receive therebetween a portion of said elastomer material.

9. The earring clutch of claim 8, wherein the shell is constructed so that it can reversibly receive the post portion.

* * * * *